(12) United States Patent
Lentner

(10) Patent No.: US 9,330,797 B2
(45) Date of Patent: May 3, 2016

(54) JET PUMP BEAM WELDLESS KEEPER LOCK PLATE

(71) Applicant: Bruce John Lentner, Wilmington, NC (US)

(72) Inventor: Bruce John Lentner, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 595 days.

(21) Appl. No.: 13/726,961

(22) Filed: Dec. 26, 2012

(65) Prior Publication Data

US 2014/0177778 A1     Jun. 26, 2014

(51) Int. Cl.
*G21C 15/00*     (2006.01)
*G21C 15/25*     (2006.01)
*G21C 13/032*     (2006.01)

(52) U.S. Cl.
CPC ............... *G21C 15/25* (2013.01); *G21C 13/032* (2013.01); *Y02E 30/40* (2013.01)

(58) Field of Classification Search
CPC ........... G21C 15/24; G21C 15/25; G21D 1/04
USPC ........................................................ 376/372
See application file for complete search history.

(56) References Cited

U.S. PATENT DOCUMENTS

| 6,434,208 B1 | 8/2002 | Erbes et al. |
| 7,764,760 B2 | 7/2010 | Francisco |
| 2006/0215801 A1 | 9/2006 | Jensen |
| 2012/0307958 A1 | 12/2012 | Mori et al. |

OTHER PUBLICATIONS

International Search Report and Written Opinion issued in connection with corresponding PCT Application No. PCT/US2013/075078 on Sep. 26, 2014.

*Primary Examiner* — Jack W Keith
*Assistant Examiner* — Sharon M Davis
(74) *Attorney, Agent, or Firm* — Harness, Dickey & Pierce, P.L.C.

(57) ABSTRACT

A lock plate for a locking device of a jet pump beam, the locking device including a locking sleeve including a lower portion, may include a beam bolt opening sized to receive the locking sleeve, and a spring arm including plurality of spring a ratchet teeth sized to mesh with locking sleeve ratchet teeth included in the lower portion of the locking sleeve, the spring arm being structured such that the spring arm has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

9 Claims, 9 Drawing Sheets

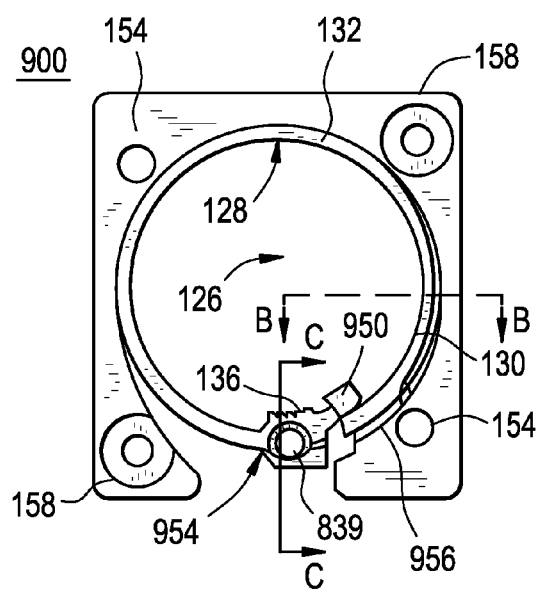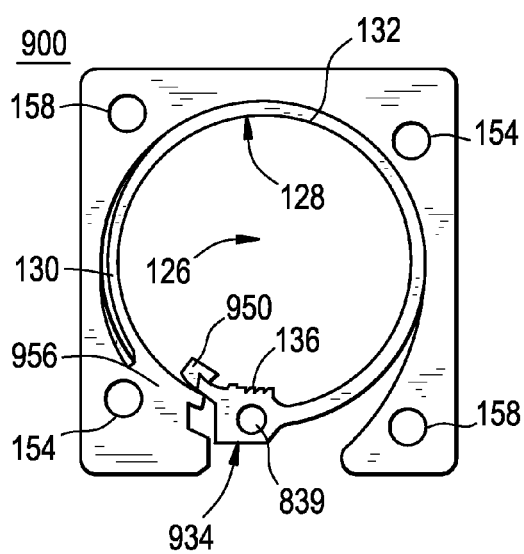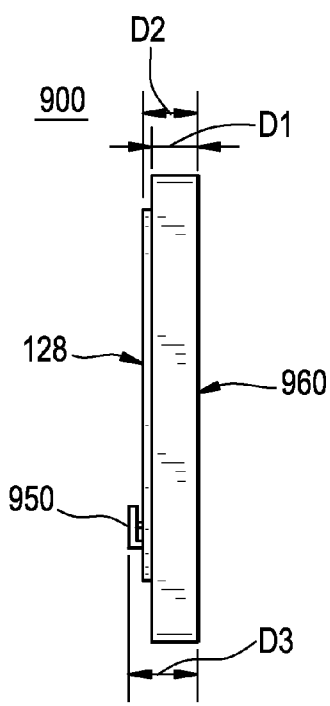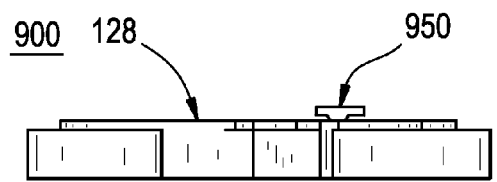

JET PUMP BEAM WELDLESS KEEPER LOCK PLATE

BACKGROUND

1. Field

The disclosure relates to devices for maintaining a desired position of a jet pump assembly within a nuclear reactor pressure vessel.

2. Description of Related Art

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within restrainer brackets by a gravity actuated wedge. The inlet mixers are each held in place at the top end by a preloaded beam. To secure the assembly, the jet pump beam is assembled with a high preload, applied by installing the jet pump beam bolt with a hydraulic tensioner.

High static and dynamic jet pump flow loads on the inlet mixer can, under some conditions, such as insufficient beam preload, cause oscillating motion and detrimental vibration excitation in the jet pump. The resultant increased vibration levels and corresponding vibration loads on the piping and supports can cause jet pump component degradation from wear and fatigue. Extreme component degradation can require plant shutdown. To assure the required preload is maintained, the beam bolt is securely locked to prevent loosening after tensioning is completed. Devices for performing tensioning and securing the beam bolt after tensioning are discussed in U.S. Pat. Nos. 6,434,208 and 7,764,760, the entire contents of each of which are incorporated herein by reference.

SUMMARY

According to at least one example embodiment, a lock plate for a locking device of a jet pump beam, the locking device including a locking sleeve including a bore extending from a first end to a second end of said locking sleeve, and a lower portion having a plurality of locking sleeve ratchet teeth around the periphery of the locking sleeve, may include a beam bolt opening sized to receive the locking sleeve; and an integral beam spring arm including, a plurality of spring arm ratchet teeth, the plurality of spring arm ratchet teeth extending from at least a portion of a side of the spring arm facing the center of the beam bolt opening and sized to mesh with the locking sleeve ratchet teeth, and a capture feature extending from at least a portion of a side of the spring arm toward the center of the beam bolt opening, the integral beam spring arm being structured such that the spring arm has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

The engaged position of the spring arm may be a position where the spring arm ratchet teeth are engaged with the locking sleeve ratchet teeth, and the disengaged position of the spring arm may be a position where the spring arm ratchet teeth are not engaged with the locking sleeve ratchet teeth.

At least a portion of the capture feature may be located at a position on the spring arm in between a location of the spring arm ratchet teeth on the spring arm and an extreme end of the spring arm opposite an end of the spring arm where the spring arm joins the rest of the lock plate.

According to at least one example embodiment, a locking device for a jet pump beam, the jet pump beam including a beam bolt having a head, may include a locking sleeve including a bore extending from a first end to a second end of said locking sleeve; and a lower portion having a plurality of locking sleeve ratchet teeth around the periphery of the locking sleeve, the lock plate including a beam bolt opening sized to receive the locking sleeve, and an integral beam spring arm including, a plurality of spring arm ratchet teeth, the plurality of spring arm ratchet teeth extending from at least a portion of a side of the spring arm facing the center of the beam bolt opening and sized to mesh with the locking sleeve ratchet teeth, and a capture feature extending from at least a portion of a side of the spring arm toward the center of the beam bolt opening, the integral beam spring arm being structured such that the spring arm has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

According to at least one example embodiment, a jet pump assembly may include a riser pipe; at least one inlet mixer; at least one diffuser coupled to said at least one inlet mixer; a transition assembly including at least two support arms, the riser pipe being coupled to the at least one inlet mixer by the transition assembly; a jet pump beam extending between two of said at least two support arm, the jet pump beam including a threaded bolt opening; a beam bolt extending through and threadedly engaging the beam bolt opening; and a locking device, the locking device including, a locking sleeve including a bore extending from a first end to a second end of said locking sleeve; and a lower portion having a plurality of locking sleeve ratchet teeth around the periphery of the locking sleeve, the lock plate including a beam bolt opening sized to receive the locking sleeve, and an integral beam spring arm including, a plurality of spring arm ratchet teeth, the plurality of spring arm ratchet teeth extending from at least a portion of a side of the spring arm facing the center of the beam bolt opening and sized to mesh with the locking sleeve ratchet teeth, and a capture feature extending from at least a portion of a side of the spring arm toward the center of the beam bolt opening, the integral beam spring arm being structured such that the spring has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIGS. 9A-9I are various views of a third lock plate according to at least one example embodiment.

DETAILED DESCRIPTION

Figure 1:
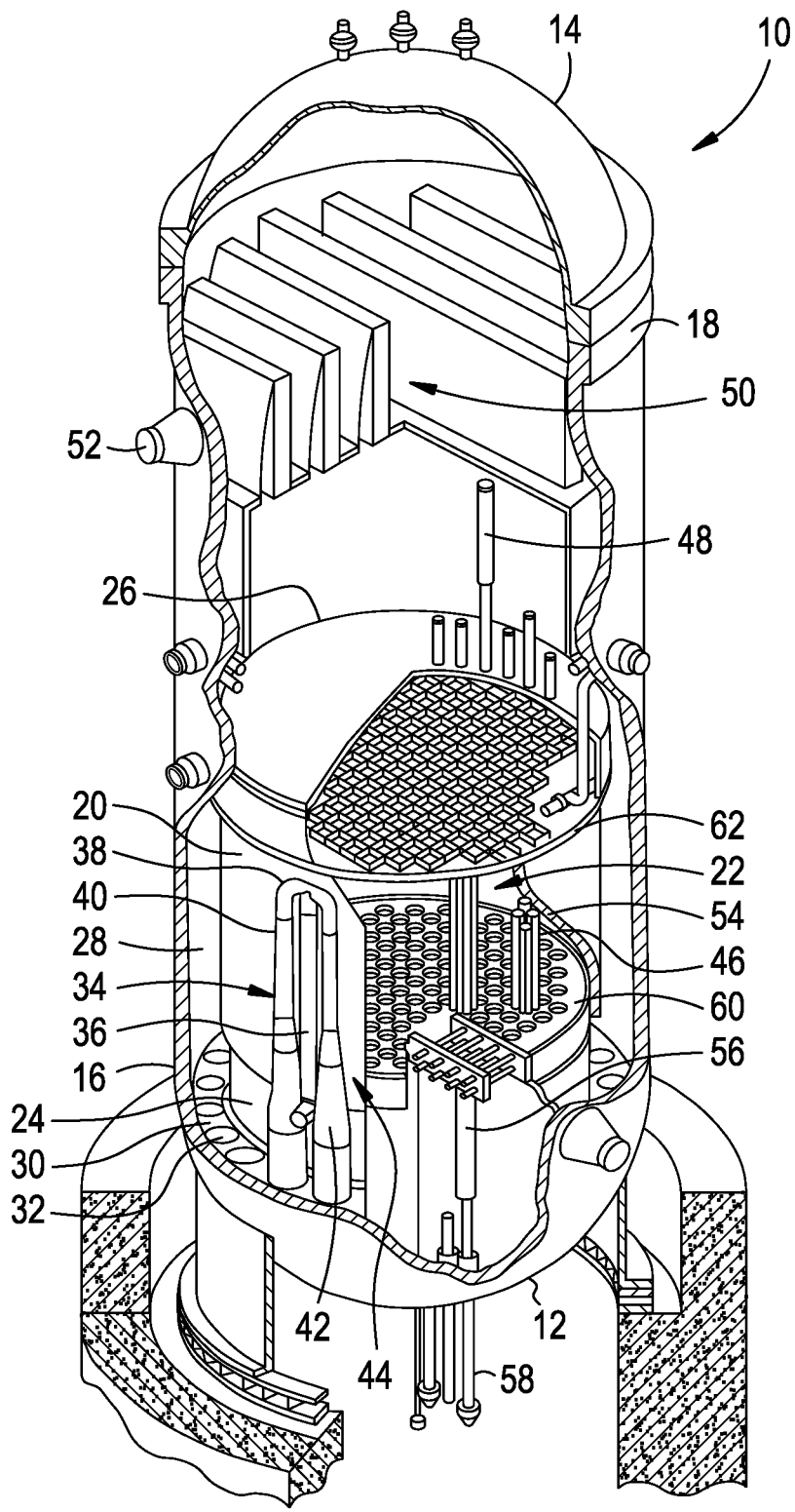
FIG. 1 is a sectional view, with parts cut away, of a boiling water nuclear reactor pressure vessel in accordance with at least one example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Jet Pump Assembly

FIG. 1 is a sectional view, with parts cut away, of a boiling water nuclear reactor pressure vessel in accordance with an example embodiment of the present invention. As shown in FIG. 1, a boiling water nuclear reactor pressure vessel (RPV) 10 is disclosed. The RPV 10 may have a generally cylindrical shape and is closed at one end by a bottom head 12 and at its other end by a removable top head 14. A side wall 16 extends from bottom head 12 to top head 14. Side wall 16 includes a top flange 18. Top head 14 may be attached to the top flange 18. A cylindrically shaped core shroud 20 surrounds a reactor core 22. Shroud 20 may be supported at one end by a shroud support 24 and may include a removable shroud head 26 at the other end. An annulus 28 is formed between shroud 20 and side wall 16. A pump deck 30, which may have a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 may include an inlet mixer 40, and a diffuser 42. Inlet riser pipe 36 and the two connected jet pumps 34 may faun a jet pump assembly 44.

Figure 2:
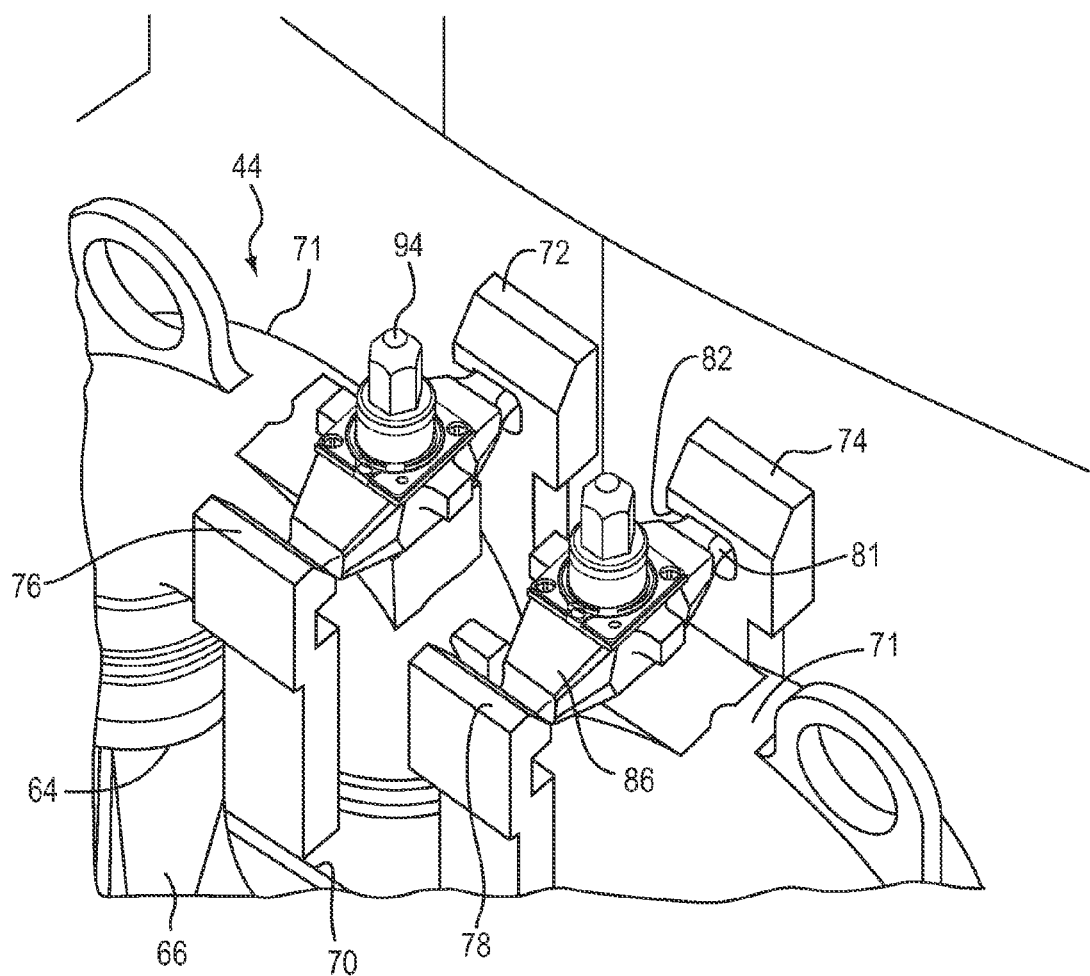
FIG. 2 is a perspective view of a jet pump assembly in accordance with at least one example embodiment.

FIG. 2 is an enlarged perspective view of a portion of the jet pump assembly 44 illustrated in FIG. 1, in accordance with an example embodiment of the present invention. As shown in FIGS. 1 and 2, the jet pump assembly 44 may include a riser pipe 36 coupled to a pair of jet pumps 34 by transition assembly 38. Referring to FIGS. 1 and 2 each jet pump 34 includes a jet pump nozzle 64, a suction inlet 66, an inlet mixer 40, and a diffuser 42 (shown in FIG. 1). The jet pump nozzle 64 may be positioned in the suction inlet 66 which may be located at a first end of inlet mixer 40. The transition assembly 38 may include a base piece 70 and two elbows 71. Each elbow 71 is coupled to a jet pump nozzle 64. Locking arms 72, 74, 76, and 78 extend from the transition assembly base piece 70. Connected between the locking arms 72, 74, 76, and 78 is a jet pump beam 86. In an example embodiment, the jet pump beam 86 engages between support arms 72 and 76, and a substantially identical jet pump beam 86 engages between support arms 74 and 78. The jet pump beam 86 includes a tongue member 81 at the end which engages notches 92 in the locking arms 72, 74, 76, and 78 for preventing and/or reducing movement (e.g., rotational movement) of the beam bolt 94. The beam 86 may engage the locking arms 72, 74, 76, and 78 by sliding the tongue member 81 into the notches 92.

Figure 3:
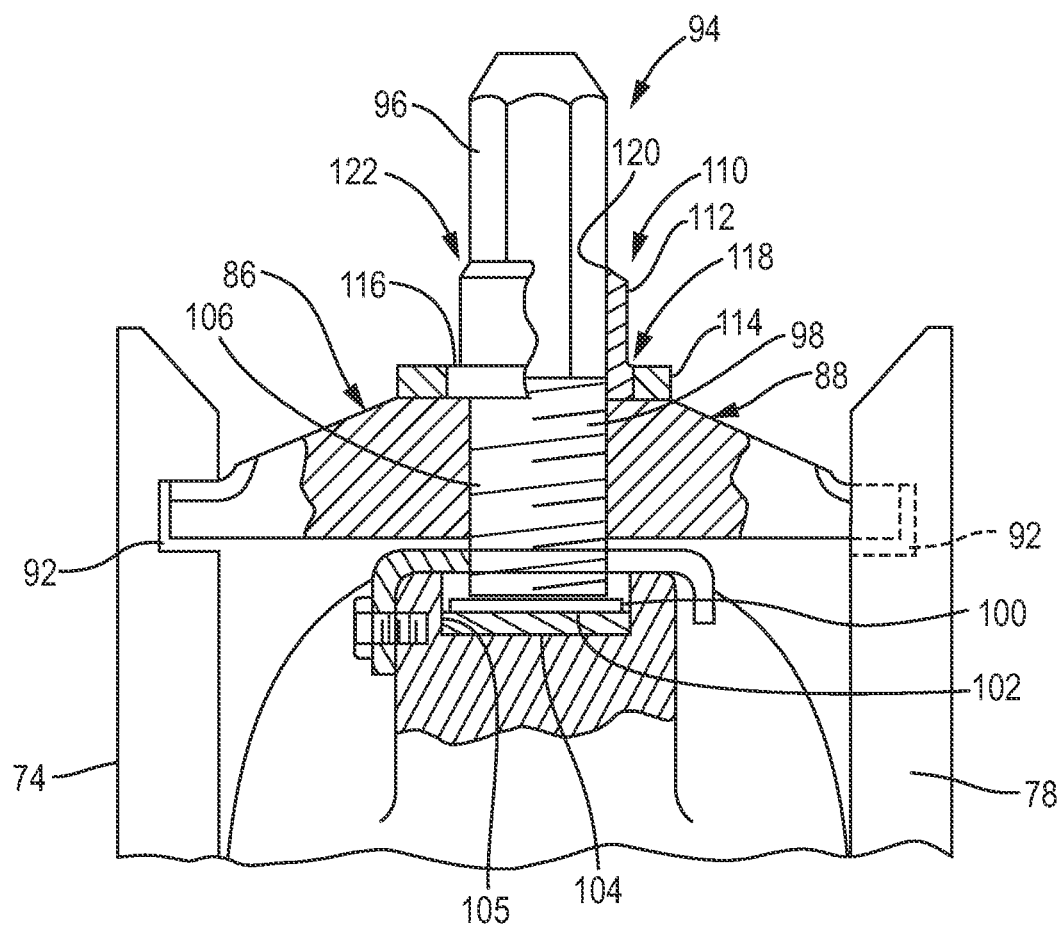
FIG. 3 is a side view of a jet pump beam in accordance with at least one example embodiment.

Referring to FIG. 3, jet pump beam 86 includes a raised central portion 88. The ends of jet pump beam 86 are supported in the notches 92 located in locking arms 72, 74, 76, and 78. A beam bolt 94 may include a multisided head 96, a threaded portion 98, and a butt end 100 including a lower bearing surface 102 which bears against a disc 104 seated in a counter bore 105 of elbow 71. Beam bolt 94 threadedly engages a threaded bolt opening 106 in jet pump beam 86.

Figure 4:
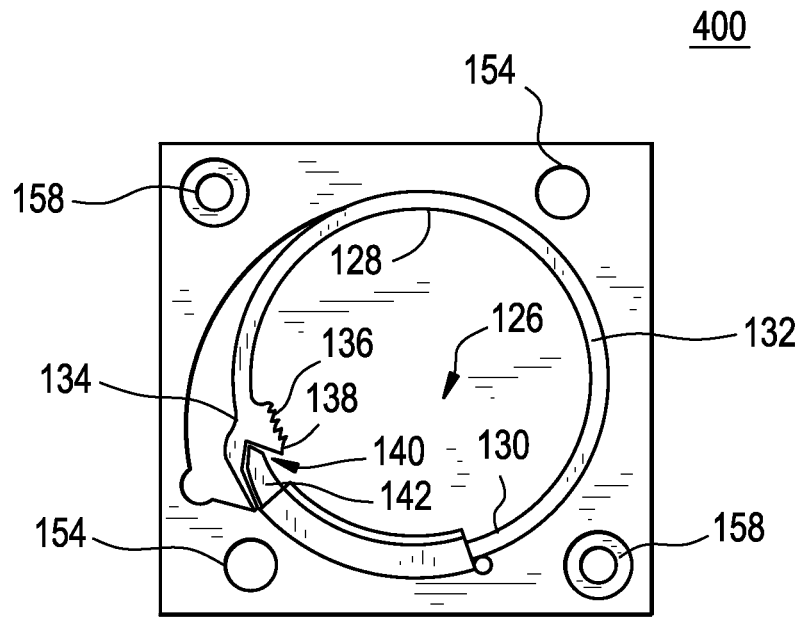
FIG. 4 is a top view of a first example lock plate.
Figure 5:
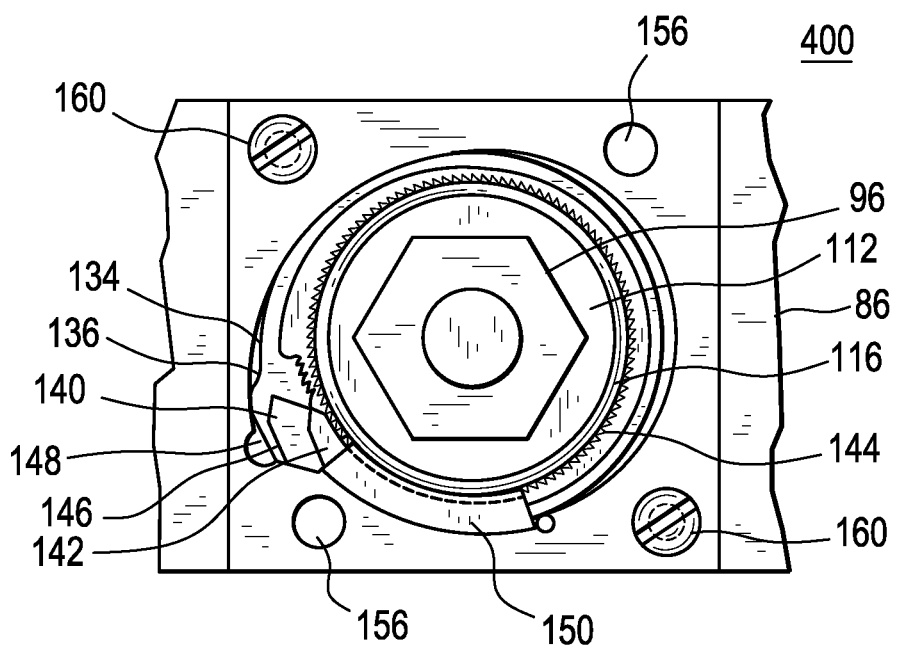
FIG. 5 is a top view of jet pump beam with a locking sleeve and the first lock plate disengaged.
Figure 6:
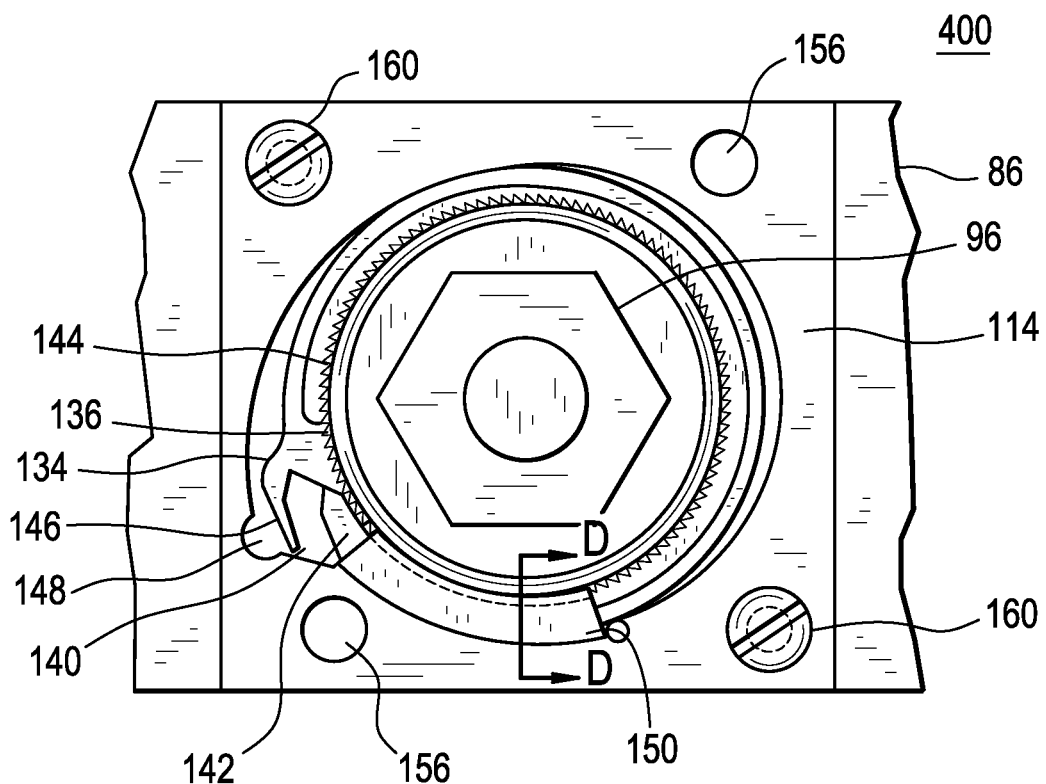
FIG. 6 is a top view of jet pump beam with the locking sleeve and the first lock plate engaged.

A locking assembly 110 prevents beam bolt 94 from loosening. Locking assembly 110 may include a locking sleeve 112 and a lock plate 114. The locking sleeve 112 may include a base portion 116 at a first end 118 and a bore 120 extending from first end 118 to a second end 122. A bore 120 may be sized and shaped to matingly receive beam bolt head 96. Examples structures of the lock plate 114 will now be discussed in greater detail below Lock Plate FIG. 4 is a top view of a first lock plate 400; FIG. 5 is a top view of jet pump beam 86 with locking sleeve 112 and the first lock plate 400 disengaged; and FIG. 6 is a top view of jet pump beam 86 with locking sleeve 112 and the first lock plate 400 engaged. The first lock plate 400 is an example structure for the lock plate 114 discussed above with reference to FIG. 3.

Referring to FIGS. 4, 5, and 6, the first lock plate 400 includes a beam bolt opening 126, an integral beam spring arm 128, and a first capture feature 150. The first capture feature 150 is a lip. Beam bolt opening 126 is sized to receive locking sleeve 112. The first capture feature 150 is configured to capture the locking sleeve 112 by engaging an upper portion of the locking sleeve 112 as will be discussed in greater detail below with reference to FIG. 7. Spring arm 128 includes a start portion 130 extending from the first lock plate 400 adjacent beam bolt opening 126, a middle portion 132 extending from start portion 130 and extending around a periphery of beam bolt opening 126, and a first end portion 134 extending from middle portion 132. First end portion 134 includes a plurality of ratchet teeth 136 extending from a side 138 of first end portion 134 facing the center of beam bolt opening 126.

First end portion 134 of spring arm 128 also includes a notch 140 located adjacent ratchet teeth 136. Notch 140 is sized to receive a detent 142 extending from the first lock plate 400 into beam bolt opening 126. Locking sleeve 112 includes a plurality of ratchet teeth 144 located circumferentially around base portion 116 and which are sized to engage and mesh with ratchet teeth 136 of spring arm 128. A tab 146 extends from first end portion 134. Tab 146 is used, in conjunction with a simple release cam tool and a cam tool opening 148 in the first lock plate 400, to deflect spring arm 128 to an engaged or disengaged position.

Spring arm 128 is movable between a first, or engaged, position (shown in FIG. 6) where detent 142 is positioned in notch 140 and spring arm ratchet teeth 136 are engaged with locking sleeve ratchet teeth 144, and a second, or disengaged, position (shown in FIG. 5) where side 138 of first end portion 134 of spring arm 128 facing contact with detent 142 and spring arm ratchet teeth 136 are disengaged from locking sleeve ratchet teeth 144. Spring arm 128 is initially machined with end portion displaced radially inboard of the first position so that installation deflects spring arm 128 and produces a radial preload force. Also, in another embodiment, spring arm 128 is machined with a thickness tapering from a maximum at start portion 130 so that the available preload displacement is maximized for a given bending stress induced in spring arm 128. It should be noted that machining of the somewhat complex geometry of locking assembly 110 is made practical by the availability of precision controlled wire electrical discharge machining. Any suitable material can be used for locking assembly 110, for example, Ni—Cr—Fe alloy X-750. The X-750 alloy provides high strength, permitting minimum size and weight of locking assembly 110, and provides corrosion resistance in the environment of a boiling water nuclear reactor.

Figure 7:
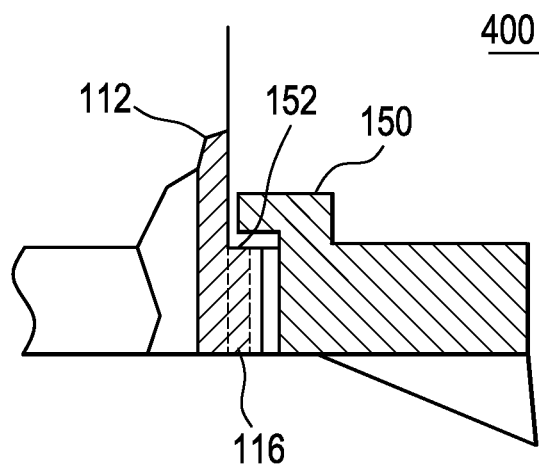
FIG. 7 is a cross sectional view of a locking sleeve and the first example lock plate.

FIG. 7 is a cross sectional view of the locking sleeve 112 and the first lock plate 400 with respect to the D-D axis illustrated in FIG. 6. Referring also to FIG. 7, the first capture feature 150 of the first lock plate 400 extends at least partially around beam bolt opening 126. The first capture feature 150 is sized to engage an upper surface 152 of locking sleeve base portion 116. Further, the first lock plate 400 includes at least one guide pin opening 154 sized to receive a jet pump beam guide pin 156 and at least one screw opening 158 sized to receive attachment screws 160.

Locking assembly 110 securely locks beam bolt 94 in place and is easily installed by slipping locking sleeve 112 over mating multisided beam bolt head 96 and mounting the first lock plate 400 to beam 86. Particularly, guide pin openings 154 are positioned over guide pins 156, and attachment screws 160 are inserted through screw openings 158 and tightened. To ensure that attachment screws 160 do not loosen, screws 160 can be tack welded to the first lock plate 400 or drilled for insertion of a lock pin. First capture feature 150 captures locking sleeve 112, and the preload force of spring arm 128 holds locking sleeve 112 securely against vibration. The shape of meshing ratchet teeth 136 and 144 permit tightening of beam bolt 94 with a tensioner to a predetermined torque, but subsequent rotation in the loosening direction is limited by meshed ratchet teeth 136 and 144 to less than one tooth space. Use of close tooth spacing minimizes the corresponding possible variation in bolt position after torqueing. The inclined contact surface between notch 140 and detent 142 wedges the meshing ratchet teeth 136 and 144 more tightly against loosening rotation, providing a self-energized lock.

To loosen beam bolt 94, a simple release cam tool, not shown, having a screw driver shaped end, is used to deflect spring arm 128 to the second position where detent 142 is in contact with side 138 of first end portion 134 of spring arm 128 so that spring arm ratchet teeth 136 are disengaged from locking sleeve ratchet teeth 144.

Figure 8:
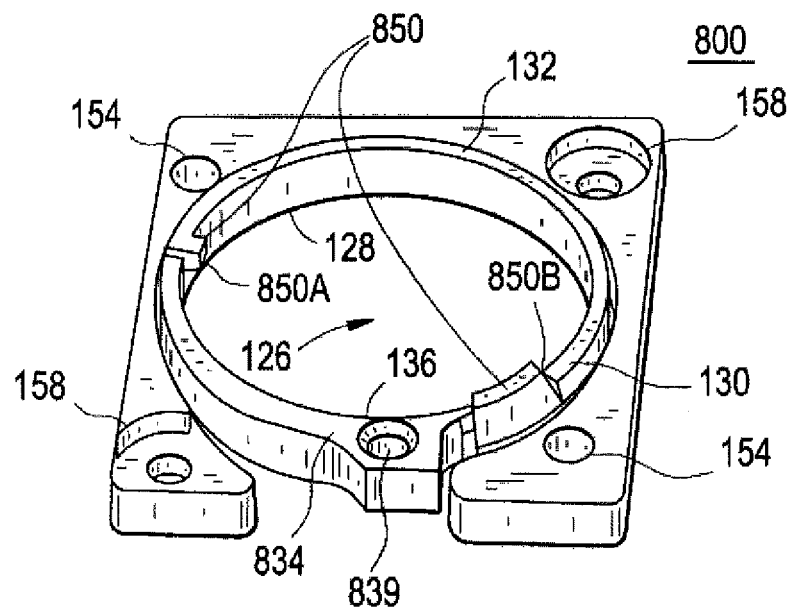
FIG. 8 is a perspective view of a second example lock plate.

FIG. 8 is a perspective view of a second lock plate 800. The second lock plate 800 is an example structure for the lock plate 114 discussed above with reference to FIG. 3.

The second lock plate 800 may operate in a manner similar to that discussed above with respect to the first lock plate 400 illustrated in FIGS. 4-7. The spring arm 128 of the second lock plate 800 includes the start portion 130, the middle portion 132 and a second end portion 834. The second end portion 834 illustrated in FIG. 8 may include a tool opening 839 in order to facilitate contact between the spring arm 128 and a cam tool used to vary the position of the spring arm 128 from an engaged position, where the spring arm ratchet teeth 136 are engaged with the locking sleeve ratchet teeth 144, to a disengaged position, where the spring arm ratchet teeth 136 are disengaged from the locking sleeve ratchet teeth 144, and vice versa.

Like the first lock plate 400, the second lock plate 800 includes a capture feature sized to engage an upper surface 152 of locking sleeve base portion 116. For example, the second lock plate 800 includes a second capture feature 850. The second capture feature 850 includes second and third lips 850A and 850B. In the same manner illustrated in FIG. 7 with respect to the first capture feature 150 of the first lock plate 400, each of the second and third lips 850A and 850B of the second capture feature 850 is sized to engage an upper surface 152 of locking sleeve base portion 116.

Accordingly, a locking plate 114 having the structure of either the first lock plate 400 or the second lock plate 800 allows the beam bolt 94 to be detensioned and tensioned repeatedly while significantly reducing the need to replace or substantially modify the locking assembly 110. However, sometimes, during detensioning of the beam bolt 94, the locking sleeve 112 may move vertically with respect to the locking plate 114. As is discussed above with reference to FIG. 7, capture features structured like the lip 150 of the first lock plate 400, or the lips 850A and 850B of the second lock plate 800 overlap with the base portion 116 of the locking sleeve 112. In a case where the locking sleeve 112 rises with respect the first lock plate 400, the locking sleeve ratchet teeth a 144 included in the base portion 116 may contact the capture feature of the first lock plate 400, the first capture feature 150. Likewise, in a case where the locking sleeve 112 rises with respect the second lock plate 800, the locking sleeve ratchet teeth 144 may contact the capture feature 850 of the second lock plate 800, second and third lips 850A and 850B.

Contact with the first capture feature 150, or either of the second and third lips 850A and 850B, may cause at least some of the locking sleeve ratchet teeth 144 to be sheared off or otherwise damaged. This damage may require the locking sleeve 112 to be replaced in order to ensure proper operation of the locking assembly 110, which is needed to ensure proper operation of the jet pump assembly 44. Replacing the locking sleeve 112 may be costly and time consuming. Accordingly, it may desirable to reduce the chances of damaging the locking sleeve ratchet teeth 144 by using a lock plate which prevents contact between a capture feature and the locking sleeve ratchet teeth 144. A lock plate according to example embodiments will now be discussed with reference to FIGS. 9A-11 below.

Figure 9A:
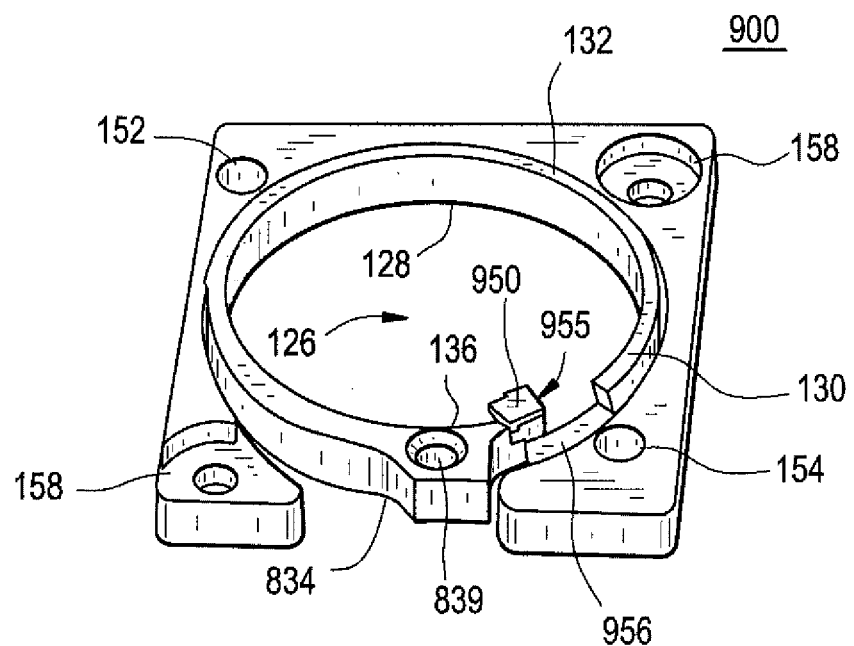
Figure 9F:
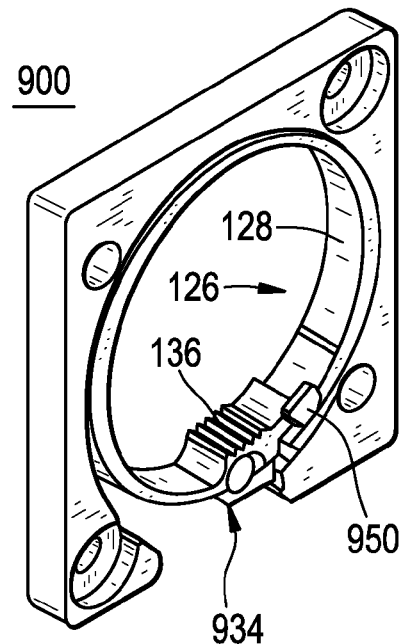
Figure 9G:
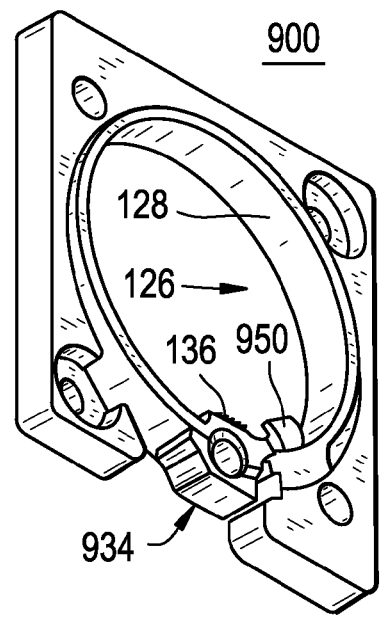
Figure 9H:
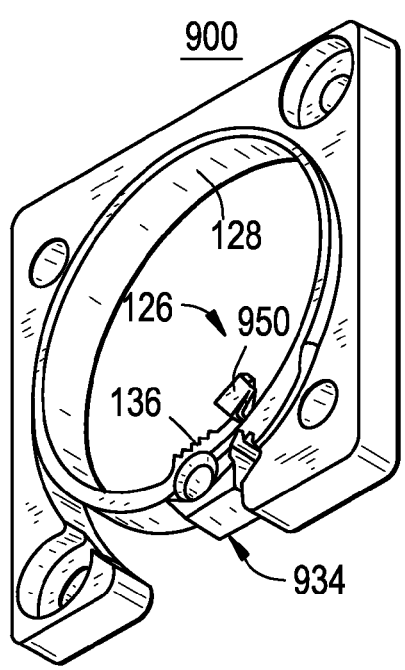
Figure 9I:
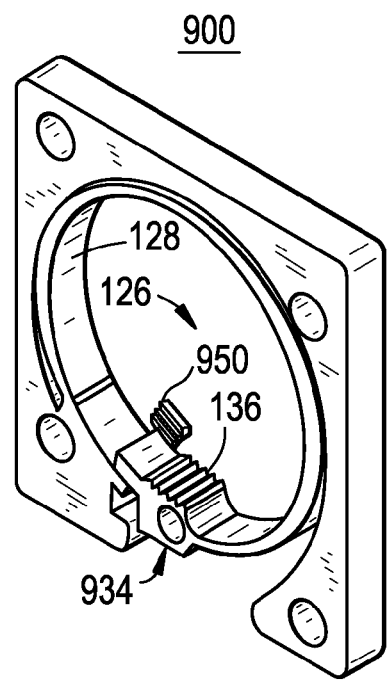
Figure 10:
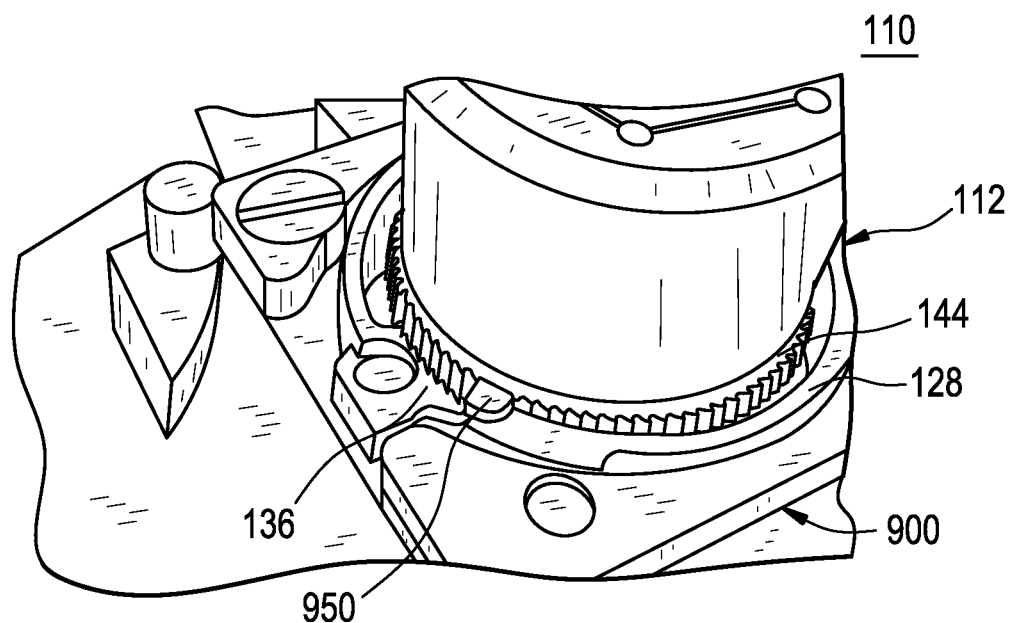
FIG. 10 illustrates a portion of a locking assembly including the third lock plate according to at least one example embodiment.
Figure 11:
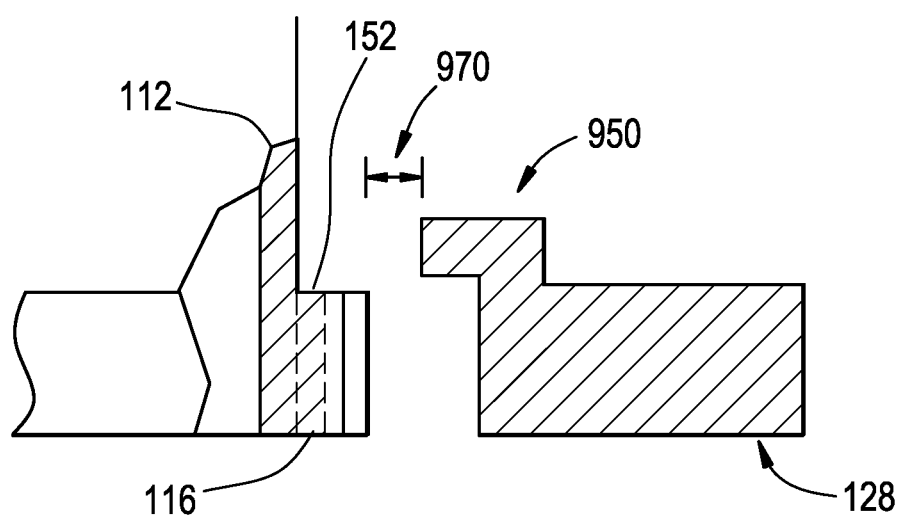
FIG. 11 is a cross sectional view of the locking sleeve and the third lock plate according to at least one example embodiment.

FIGS. 9A-9I illustrate various views of a third lock plate 900 according to at least one example embodiment. The third lock plate 900 is an example structure for the lock plate 114 illustrated in FIG. 3. FIGS. 9A and 9F-9I illustrate the third lock plate 900 from various perspective views. FIG. 9B illustrates a top view of the third lock plate 900. FIG. 9C illustrates a bottom view of the third lock plate 900. FIG. 9D illustrates a side view which is the top view illustrated in FIG. 9B rotated 90° about the C-C axis illustrated in FIG. 9B. FIG. 9E illustrates a side view which is the top view illustrated in FIG. 9B rotated 90° about the B-B axis illustrated in FIG. 9B. In FIGS. 9A-9I the third lock plate 900 is illustrated in an engaged position. FIG. 10 illustrates a portion of the locking assembly 110 including, as the lock plate 114, the third lock plate 900 according to at least one example embodiment. In FIG. 10, the third lock plate 900 is illustrated in a disengaged position. FIG. 11 is a cross sectional view of the locking sleeve 112 and the spring arm 128 of the third lock plate 900 according to at least one example embodiment.

With the exceptions discussed below, the third lock plate 900 may have the same interaction with the locking sleeve 112, structure, and operation as that discussed above with respect to the first lock plate 400 illustrated in FIGS. 4-7.

The spring arm 128 of the third lock plate 900 includes the start portion 130, the middle portion 132 and a third end portion 934. According to at least one example embodiment, the third end portion 934 may include a tool opening 839 in order to facilitate contact between the spring am 128 and a cam tool used to vary the position of the spring arm 128 from an engaged position to a disengaged position, and vice versa. Optionally, according to at least one example embodiment, the lock plate 900 may not include the notch 140 or the cam tool opening 148.

Further, according to at least one example embodiment, instead of the first capture feature 150, the third lock plate 900 may include a third capture feature 950. The third capture feature 950 may be, for example, a lip or protrusion that extends from the end portion 934 of the spring arm 112 inwards towards a center of the third lock plate 900. According to at least one example embodiment, at least a portion of the third capture feature 950 may be in between the spring arm ratchet teeth 136 and an outermost region 955 of the spring arm 128, the outermost region 955 being a most extreme portion of the spring arm 128 with respect to a point in the start region 130 where the spring arm 128 joins the remaining portion of the third lock plate 900.

As is illustrated in FIG. 9D, according to at least one example embodiment, an upper surface of the third capture feature 950 may be positioned at a height D3 above a base 960 of the third lock plate 900. Further, a remaining portion of the spring arm 128 (for example, a portion of the spring arm 128 not including the third capture feature 950) may have a upper surface with a height D2 above the base 960 of the third lock plate 900. As is illustrated in FIG. 9D, the height D2 may be less than the height D1 of an upper surface of the third capture feature 950 as well as a lower surface of the third capture feature 950. Further, a remaining portion of the third lock plate 900 (for example, a portion of the third lock plate 900 not including the spring arm 128) may have an upper surface with a height D1 above the base 960 of the third lock plate 900. According to at least one example embodiment, D3>D2>D1. Accordingly, as is illustrated in FIG. 9D, the third capture feature 950 may be positioned above both an upper surface of a remaining portion of the spring arm 128, and an upper surface of a remaining portion of the third lock plate 900.

According to at least one example embodiment, the third capture feature 950 is structured such that when the locking sleeve 112 is in the beam bolt opening 126, and the spring arm 128 is in an engaged position, at least a portion of the third capture feature 950 vertically overlaps at least a portion of the base region 116 of the locking sleeve 112; and when the locking sleeve 112 is in the beam bolt opening 126, and the spring arm 128 is in the disengaged position, there is no overlap between the third capture feature 950 and the base region 116 of the locking sleeve 112 in the vertical direction. The engaged position of the spring arm 128 refers to, for example, a position where the spring arm ratchet teeth 136 of the spring arm 128 are engaged or meshed with the locking sleeve ratchet teeth 144 of the locking sleeve 112. The disengaged position of the spring arm 128 refers to, for example, a position where the spring arm 128 is deflected such that the ratchet teeth 136 are not engaged or meshed with the locking sleeve ratchet teeth 144 of the locking sleeve 112. Thus, according to at least one example embodiment, the third capture feature 950 is sized and positioned on spring arm 128 such that the following conditions are met: 1) when the spring arm 128 of the third lock plate 900 is in the engaged position, the third capture feature 950 engages an upper surface 152 of locking sleeve base portion 116 in the same manner illustrated in FIG. 7 with respect to the first capture feature 150 of the first lock plate 400; and 2) when the spring arm 128 of the third lock plate 900 is in the disengaged position, the third capture feature 950 does not engage, or overlap in the vertical direction, the upper surface 152 of the locking sleeve base portion 116, and a horizontal gap 970 exists between the upper surface 152 and the capture feature 950, as is shown in FIGS. 10 and 11.

The positioning on spring arm 128 and sizing of the third capture feature 950 illustrated in FIGS. 9A-11 are provided only as an example. According to at least one example embodiment, the capture feature 950 may have any combination of positioning on the spring arm 128 and sizing which allow the capture feature 950 to move with the end portion 936 of the spring arm 128 such that, if the locking sleeve 112 is in the beam bolt opening 126 of the third lock plate 900, the third capture feature 950 overlaps the base portion 116 of the locking sleeve 112 when the spring arm 128 is in the engaged position, and the capture feature 950 does not overlap the base portion 116 of the locking sleeve 112 when the spring arm 128 is in the disengaged position.

Accordingly, using the third lock plate 900, during a detensioning operation where the spring arm 128 is deflected to the disengaged position, no overlap exists in the vertical direction between the third capture feature 950 and the base portion 116 of the locking sleeve 112, as is illustrated in FIGS. 10 and 11. Consequently, in the event the locking sleeve 112 shifts vertically during the detensioning operation, the chances of the third lock plate 900 shearing off or otherwise damaging the sleeve ratchet teeth 144, or any other part of the base portion 116 of the locking sleeve 112, may be significantly reduced. Accordingly, the lost time and expense associated with repairing or replacing the damaged locking sleeve 112 may be avoided by using the third lock plate 900 according to example embodiments.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A lock plate for a locking device of a jet pump beam, the locking device including a locking sleeve including a bore extending from a first end to a second end of said locking sleeve, and a lower portion having a plurality of locking sleeve ratchet teeth around the periphery of the locking sleeve, the lock plate comprising:
    a beam bolt opening sized to receive the locking sleeve; and
    an integral beam spring arm including,
        a plurality of spring arm ratchet teeth, the plurality of spring arm ratchet teeth extending from at least a portion of a side of the spring arm facing the center of the beam bolt opening and sized to mesh with the locking sleeve ratchet teeth, and
        a capture feature extending from at least a portion of a side of the spring arm toward the center of the beam bolt opening,
    the integral beam spring arm being structured such that the spring arm has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

2. The lock plate of claim 1, wherein the engaged position of the spring arm is a position where the spring arm ratchet teeth are engaged with the locking sleeve ratchet teeth, and the disengaged position of the spring arm is a position where the spring arm ratchet teeth are not engaged with the locking sleeve ratchet teeth.

3. The lock plate of claim 1, wherein at least a portion of the capture feature is located at a position on the spring arm in between a location of the spring arm ratchet teeth on the spring arm and an extreme end of the spring arm opposite an end of the spring arm where the spring arm joins the rest of the lock plate.

4. A locking device for a jet pump beam, the jet pump beam including a beam bolt having a head, the locking device comprising:
    a locking sleeve including a bore extending from a first end to a second end of said locking sleeve; and
    a lower portion having a plurality of locking sleeve ratchet teeth around the periphery of the locking sleeve, the lock plate including
        a beam bolt opening sized to receive the locking sleeve, and
        an integral beam spring arm including,
            a plurality of spring arm ratchet teeth, the plurality of spring arm ratchet teeth extending from at least a portion of a side of the spring arm facing the center of the beam bolt opening and sized to mesh with the locking sleeve ratchet teeth, and
            a capture feature extending from at least a portion of a side of the spring arm toward the center of the beam bolt opening,
    the integral beam spring arm being structured such that the spring arm has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

5. The locking device of claim 4, wherein the engaged position of the spring arm is a position where the spring arm ratchet teeth are engaged with the locking sleeve ratchet teeth, and the disengaged position of the spring arm is a position where the spring arm ratchet teeth are not engaged with the locking sleeve ratchet teeth.

6. The locking device of claim 4, wherein at least a portion of the capture feature is located at a position on the spring arm in between a location of the spring arm ratchet teeth on the spring arm and an extreme end of the spring arm opposite an end of the spring arm where the spring arm joins the rest of the lock plate.

7. A jet pump assembly comprising:
    a riser pipe;
    at least one inlet mixer;
    at least one diffuser coupled to said at least one inlet mixer;
    a transition assembly including at least two support arms, the riser pipe being coupled to the at least one inlet mixer by the transition assembly;
    a jet pump beam extending between two of said at least two support arm, the jet pump beam including a threaded bolt opening;

a beam bolt extending through and threadedly engaging the beam bolt opening; and a locking device, the locking device including,
 a locking sleeve including a bore extending from a first end to a second end of said locking sleeve; and
 a lower portion having a plurality of locking sleeve ratchet teeth around the periphery of the locking sleeve, the lock plate including
  a beam bolt opening sized to receive the locking sleeve, and
  an integral beam spring arm including,
   a plurality of spring arm ratchet teeth, the plurality of spring arm ratchet teeth extending from at least a portion of a side of the spring arm facing the center of the beam bolt opening and sized to mesh with the locking sleeve ratchet teeth, and
   a capture feature extending from at least a portion of a side of the spring arm toward the center of the beam bolt opening,
the integral beam spring arm being structured such that the spring has both i) an engaged position where the locking sleeve is in the beam bolt opening and at least a portion of the capture feature overlaps vertically with an upper surface of the lower portion of the locking sleeve, and ii) a disengaged position where the locking sleeve is in the beam bolt opening and the capture feature does not overlap vertically with the upper surface.

8. The jet pump assembly of claim 7, wherein the engaged position of the spring arm is a position where the spring arm ratchet teeth are engaged with the locking sleeve ratchet teeth, and the disengaged position of the spring arm is a position where the spring arm ratchet teeth are not engaged with the locking sleeve ratchet teeth.

9. The jet pump assembly of claim 7, wherein at least a portion of the capture feature is located at a position on the spring arm in between a location of the spring arm ratchet teeth on the spring arm and an extreme end of the spring arm opposite an end of the spring arm where the spring arm joins the rest of the lock plate.

* * * * *